(12) United States Patent
Fagan et al.

(10) Patent No.: US 6,810,691 B2
(45) Date of Patent: Nov. 2, 2004

(54) METHOD FOR MAKING GLASS TUBING WITH MULTIPLE BORES

(75) Inventors: James Gerard Fagan, Corning, NY (US); David J. Gokey, Burdett, NY (US); Nikki J. Russo, Alpine, NY (US)

(73) Assignee: Corning Incorporated, Corning, NY (US)

(*) Notice: Subject to any disclaimer, the term of this patent is extended or adjusted under 35 U.S.C. 154(b) by 321 days.

(21) Appl. No.: 10/184,838

(22) Filed: Jun. 28, 2002

(65) Prior Publication Data

US 2004/0000169 A1 Jan. 1, 2004

(51) Int. Cl.[7] .............................................. C03B 23/04
(52) U.S. Cl. ...................... 65/276; 65/407; 65/DIG. 9; 385/70
(58) Field of Search ........................ 65/406–408, 269, 65/275–276; 385/70, 76–78, 95–96

(56) References Cited

U.S. PATENT DOCUMENTS

| | | | |
|---|---|---|---|
| 3,625,248 A | 12/1971 | Loxley et al. ................. 65/108 |
| 3,897,233 A | 7/1975 | Szilagyi ....................... 65/109 |
| 4,101,198 A * | 7/1978 | Heldt ............................ 385/81 |
| 4,257,674 A | 3/1981 | Griffin et al. ............. 350/96.21 |
| 4,525,192 A | 6/1985 | Booms ......................... 65/110 |
| 4,822,389 A | 4/1989 | Berkey ............................ 65/2 |
| 4,896,938 A * | 1/1990 | Mathis et al. ................. 385/70 |
| 4,902,324 A * | 2/1990 | Miller et al. .................. 65/407 |
| 4,917,718 A | 4/1990 | Berkey ......................... 65/108 |
| 4,919,510 A | 4/1990 | Hoke et al. .............. 350/96.21 |
| 4,931,120 A | 6/1990 | Christoff ..................... 156/153 |
| 5,745,626 A * | 4/1998 | Duck et al. ................... 385/96 |
| 5,980,117 A * | 11/1999 | Feuer et al. .................. 385/78 |
| 6,460,378 B1 * | 10/2002 | Dong et al. ................... 65/412 |
| 6,499,886 B1 * | 12/2002 | Mizuno et al. ................ 385/70 |
| 2001/0036339 A1 * | 11/2001 | Morishita et al. ............. 385/70 |
| 2003/0143349 A1 * | 7/2003 | Mizuno et al. ............. 428/34.4 |

* cited by examiner

*Primary Examiner*—Peter Chin
*Assistant Examiner*—Carlos Lopez
(74) *Attorney, Agent, or Firm*—Adenike A. Adewuya; Timothy M. Schaeberle

(57) ABSTRACT

A method of making glass tubing includes assembling together a first glass rod having at least one bore and a second glass rod having at least one bore to form a single glass unit, shaping an outer surface of the glass unit to a desired cross-section, and drawing the glass unit to form a glass tubing having a predetermined outer and inner dimension.

22 Claims, 7 Drawing Sheets

METHOD FOR MAKING GLASS TUBING WITH MULTIPLE BORES

BACKGROUND OF INVENTION

1. Field of the Invention

The invention relates generally to methods for making capillary splices. More specifically, the invention relates to a method for making glass tubing.

2. Background Art

Fiber-optic systems require means for transferring energy from one optical fiber to another without undue power loss. One means for transferring energy from one optical fiber to another is to position the optical fibers in an end-to-end relationship so that light emanating from one fiber end face is directed into the adjacent fiber end face.

Capillary splices (also known as ferrules) are used to align sets of optical fibers in an end-to-end relationship. FIG. 1 shows a cross-section of a prior-art capillary splice 1, which includes a tubing 2 having a longitudinal bore 3. The tubing 2 may be made of ceramic, glass, glass-ceramic, or polymeric material. In general, the tubing material will depend on the anticipated application requirements. Terminal ends of optical fibers 4, 5 are inserted into the bore 3 to place the optical fibers 4, 5 in an end-to-end relationship.

It is usually desirable to make the diameter of the bore 3 only a few microns larger than the diameter of the optical fibers 4, 5 so that the optical axes of the optical fibers 4, 5 remain substantially aligned when inserted into the bore 3. Funnel-like apertures 6, 7 are typically formed at the ends of the bore 3 to facilitate insertion of the optical fibers 4, 5 into the bore 3. The funnel-like apertures 6, 7 also provide a mounting location for bonding material 8, 9, which is used to secure the optical fibers 4, 5 to the tubing 2. In general, one or both ends of the bore 3 may be terminated with a funnel-like aperture.

U.S. Pat. Nos. 4,822,389 and 4,917,718, both issued to Berkey, disclose a method for making a capillary splice from glass tubing. The method involves placing the bore of the glass tubing under pressure by filling the bore with a fluid, such as air, nitrogen, and the like, and then applying localized heat to the glass tubing. As the glass tubing is heated to its softening point, the inside wall of the bore starts to expand within the softened area by the pressure of the fluid within the bore. The pressure causes a bubble to begin to form within the glass tubing.

FIG. 2A shows a bubble 10 forming within a glass tubing 11 as the bore 12 of the glass tubing 11 is pressurized with fluid 13 and the glass tubing 11 is heated to its softening point by a burner 14. The glass tubing 11 is rotated as it is heated to allow for uniform heat distribution along the diameter of the glass tubing 11. As the glass tubing 11 is rotated and subjected to localized heating, the bubble 10 continues to expand until it occupies a major portion of the diameter of the glass tubing 11. FIG. 2B shows the bubble 10 occupying a major portion of the diameter of the glass tubing 11. The outer diameter of the glass tubing 11 in the vicinity of the bubble 10 may increase slightly as a result of the bubble growth within the glass tubing 11. This slight increase in diameter may be eliminated by stretching the glass tubing 11 along its longitudinal axis as the bubble 10 is formed.

Multiple bubbles can be formed at spaced intervals along the length of the glass tubing 11 using the process described above. FIG. 2C shows two bubbles 10 formed within the glass tubing 11 using the process described above. To form the splice, the glass tubing 11 is scored along its exterior surface at about the center of each of the bubbles 10. Thereafter, the glass tubing 11 is severed along the score line to produce the splice.

As previously mentioned, splices are used to align and couple optical fibers. Therefore, they must be manufactured with extreme precision and tight tolerances to avoid undue power loss between the optical fibers. The process of forming a capillary splice that meets required specifications starts with a glass tubing having precise inner and outer dimensions.

SUMMARY OF INVENTION

In one aspect, the invention relates to a method of making glass tubing which comprises assembling together a first glass rod having at least one bore and a second glass rod having at least one bore into a single glass unit, shaping an outer surface of the glass unit to a desired cross-section, and drawing the glass unit to form a glass tubing having a predetermined inner and outer dimension.

In another aspect, the invention relates to a method of making glass tubing which comprises assembling together a first glass rod having at least one bore and a second glass rod having at least one bore to form a single glass unit, shaping an outer surface of the glass unit to a desired cross-section, inserting the glass unit into an outer clad glass tube to form a tube assembly, and drawing the tube assembly to form a glass tubing having a predetermined inner and outer dimension.

Other features and advantages of the invention will be apparent from the following description and the appended claims.

DETAILED DESCRIPTION

Figure 1:
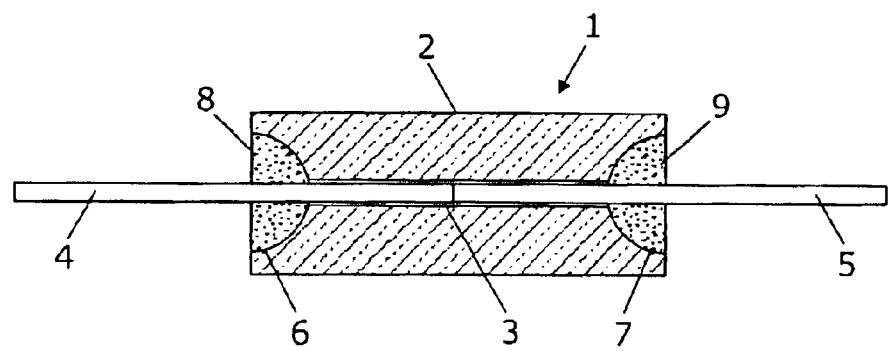
FIG. 1 shows a cross-section of a prior-art capillary splice.
Figure 2A:
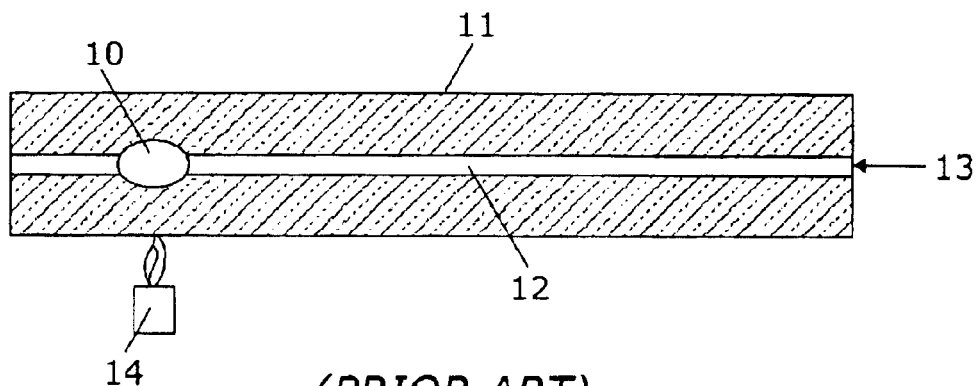
FIG. 2A shows a bubble being formed within glass tubing using a prior art method.
Figure 2B:
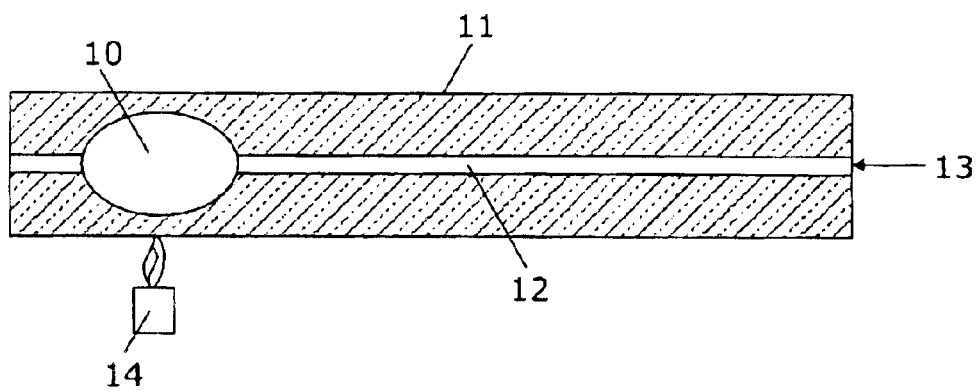
FIG. 2B shows the bubble of FIG. 2A now occupying a major diameter of the glass tubing of FIG. 2A.
Figure 2C:
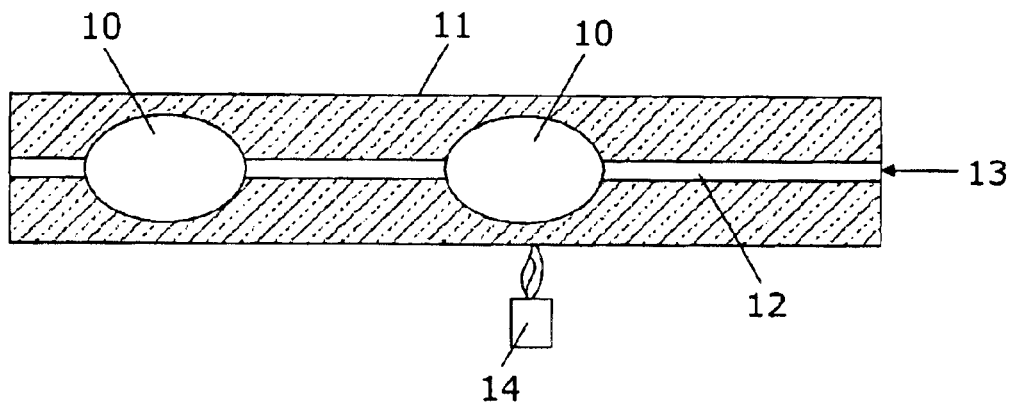
FIG. 2C shows multiple bubbles formed along a length of the glass tubing of FIG. 2A.

Embodiments of the invention provide a process for forming precision glass tubing with multiple bores. The process involves using two glass rods, each having one or more bores, to make the glass tubing. The glass rods are first assembled into a single glass unit. The single glass unit is then drawn to the required tubing size. The drawing process may be accomplished in one or more steps. Specific embodiments of the invention are described below with reference to the accompanying drawings.

Figure 3:
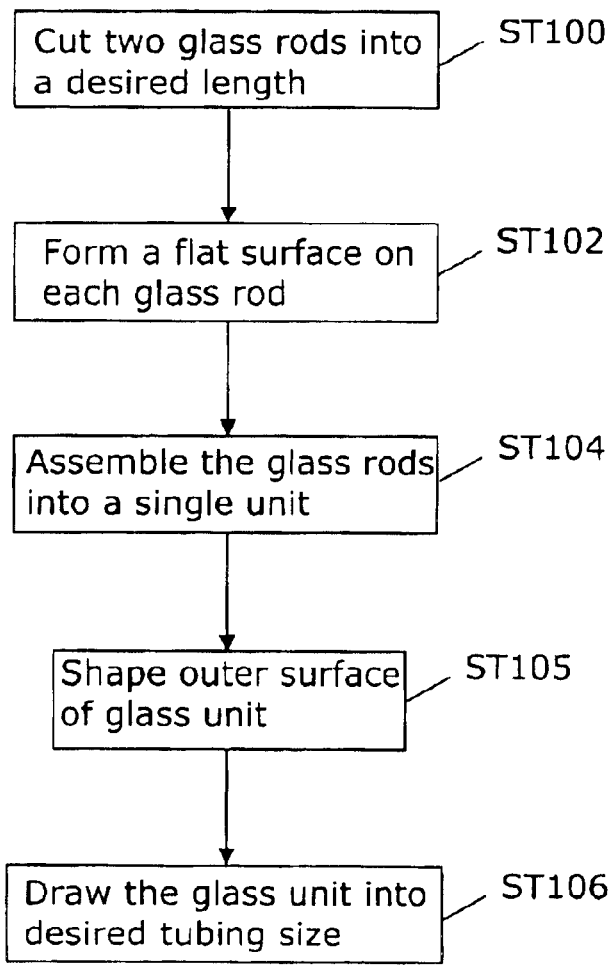
FIG. 3 is a flowchart illustrating a process for making glass tubing in accordance with one embodiment of the invention.

FIG. 3 is a flowchart illustrating a process for making glass tubing according to an embodiment of the invention. The process starts with cutting two glass rods into a desired length (ST100). The next step in the process involves forming a flat surface on the outer surface of each glass rod (ST102). After forming the flat surfaces on the outer surfaces of the glass rods, the glass rods are assembled into a single glass unit by bringing their flat surfaces together (ST104). The outer surface of the glass unit is then shaped into a desired cross-section, e.g., round, (ST105). The next step involves drawing the glass unit to form the desired tubing size (ST106). In one embodiment, step ST106 is preceded by sealing together of the glass rods in the glass unit. "Sealing" is the process by which the glass rods are fused together using heat or heat and pressure.

Figure 4:
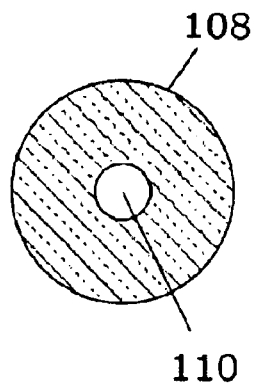
FIG. 4 shows a cross-section of a glass rod having a bore.

The invention will now be further described with the aid of illustrations. FIG. 4 shows a glass rod 108 having a bore 110. It should be noted that the invention is not limited to glass rods having a single bore. In other words, the glass rods used in the invention may also have multiple bores. Typically, the glass rod 108 is made of fused silica. Other glass materials, such as borosilicate, may also be used. In general, the glass material used in forming the glass rod would depend on application requirements.

Figure 5:
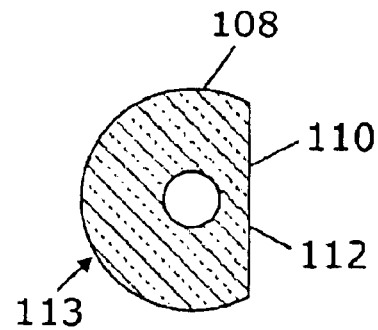
FIG. 5 shows a flat surface formed on an outer surface of a glass rod.

FIG. 5 shows a flat surface 112 formed on the outer surface 113 of the glass rod 108. The flat surface 112 may be formed by grinding the outer surface 113 of the glass rod 108 using a surface grinder (not shown) or other suitable equipment. Examples of other methods for forming the flat surface 112 include abrasive waterjet cutting and laser machining.

Figure 6:
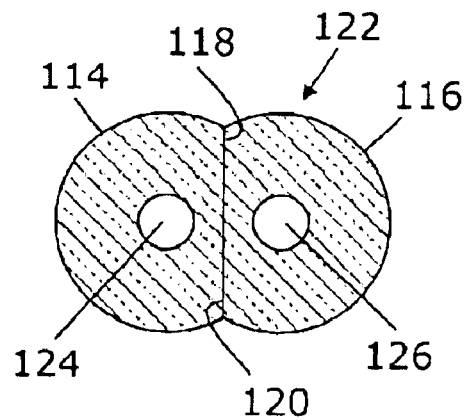
FIG. 6 shows two glass rods assembled into a single glass unit.
Figure 7:
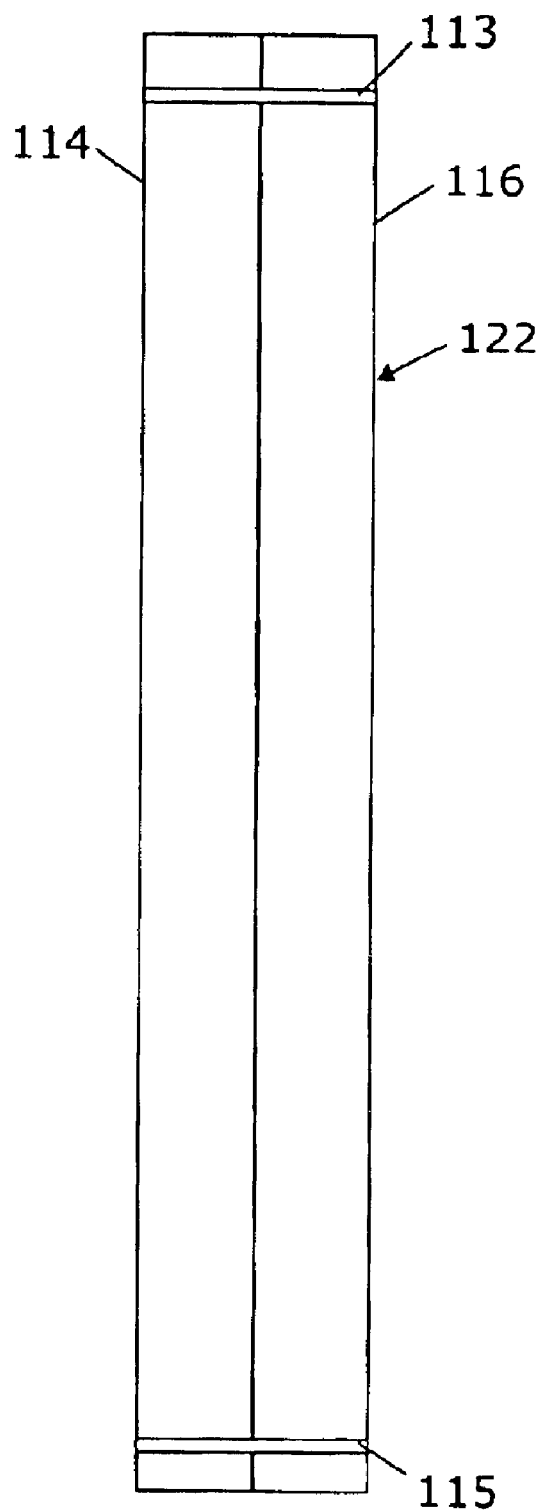
FIG. 7 shows two glass rods assembled into a single glass unit and secured together by retainer rings.

FIG. 6 shows two glass rods 114, 116 assembled into a single glass unit 122 by bringing the flat surfaces 118, 120 together. After bringing the flat surfaces 118, 120 together, the glass rods 114, 116 may be secured together to facilitate handling. For example, FIG. 7 shows the glass rods 114, 116 secured together by retainer rings 113, 115. The retainer rings 113, 115 are inserted in grooves on the outer diameter of the glass rods 114, 116. Any other suitable means of securing the glass rods 114, 116 together can be used, e.g., clamping.

Figure 8:
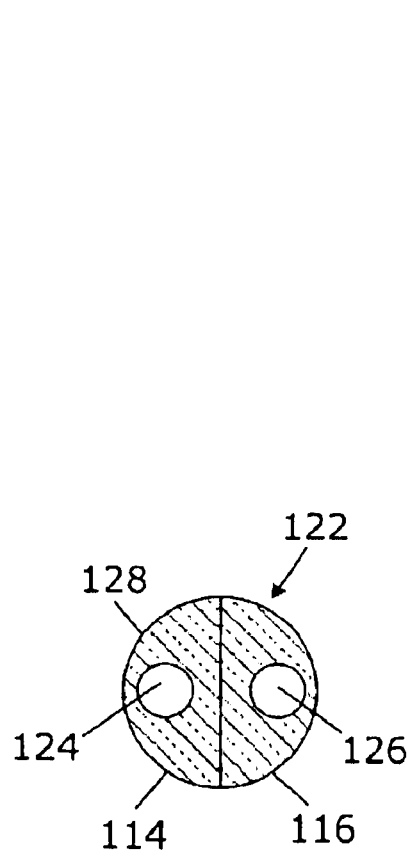
FIG. 8 shows the single glass unit of FIG. 6 after rounding.

FIG. 8 shows the outer surface 128 of the glass unit 122 rounded. As an example, the outer surface 128 of the glass unit 122 could be rounded on a lathe machine (not shown). Typically, the rounded outer surface 128 of the glass unit 122 would be subsequently polished to a desired surface finish. It should be noted that the invention is not limited to making the cross-section of the glass unit 122 round. The cross-section of the glass unit 122 could be square, for example.

Figure 9:
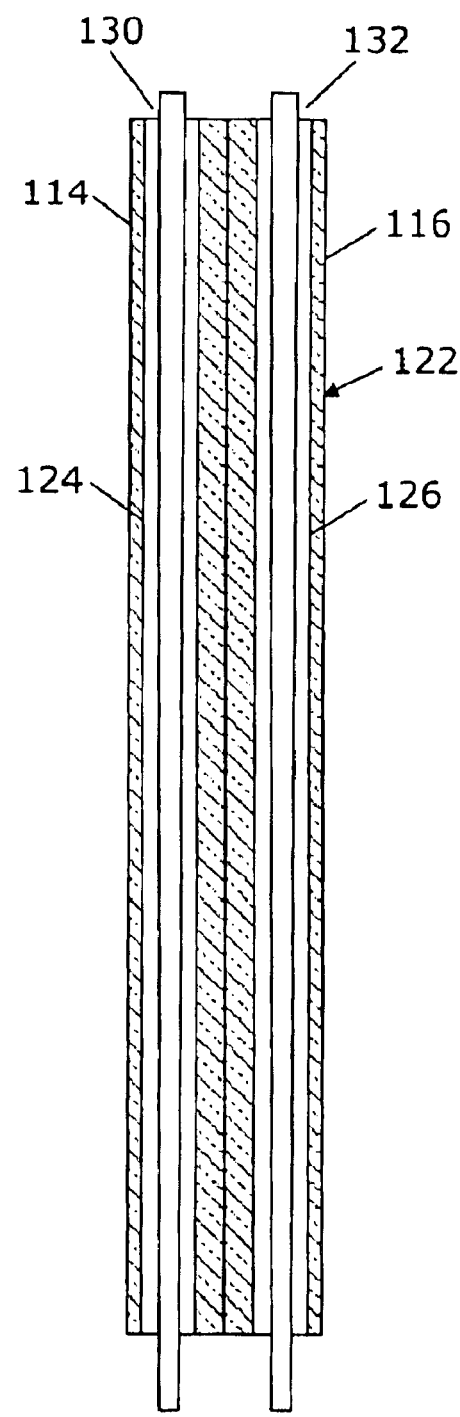
FIG. 9 shows removable inserts inserted into bores in the single glass unit of FIG. 8.

In one embodiment of the invention, the glass rods 114, 116 are sealed together prior to drawing the glass unit 122 into a desired tubing size. One method for sealing the glass rods 114, 116 is referred to as a shrink process. As shown in FIG. 9, the shrink process involves inserting removable rods 130, 132 having a desired diameter into the bores 124, 126 in the glass rods 114, 116, respectively. Heat is then applied to the glass rods 114, 116 to shrink the glass rods 114, 116 around the removable rods 130, 132, respectively, while simultaneously fusing the glass rods 114, 116 together. To reduce the heat requirement for the shrinking process, pressure may also be applied to the glass rods 114, 116 while heating the glass rods 114, 116. The diameter of the removable rods 130, 132 determine the diameter of the bores 124, 126 during the shrinking process.

After shrinking the bores 124, 126 to the desired diameter, the glass unit 122 is cooled down, and the removable rods 130, 132 are removed from the bores 124, 126. The method for removing the removable rods 130, 132 from the bores 124, 126 depends on the type of removable rods. Typically, the removable rods 130, 132 may be removed from the bores 124, 126 via mechanical retraction, grinding, acid etching, or thermal oxidation. In one embodiment, the removable rods 130, 132 are made of a metallic material. The metallic material could be selected such that the removable rods 130, 132 shrink faster than the glass rods 114, 116 during cooling. A wide variety of metals, such as stainless steel and inconel, shrink faster than glass during cooling. The removable rods 130, 132 could have bores through which cold fluid can be circulated to increase the rate at which the removable rods 130, 132 shrink during cooling. In another embodiment, the removable rods 130, 132 are made of a "fugitive" material that can be easily oxidized, e.g., graphite, carbides, or nitrides.

Figure 10:
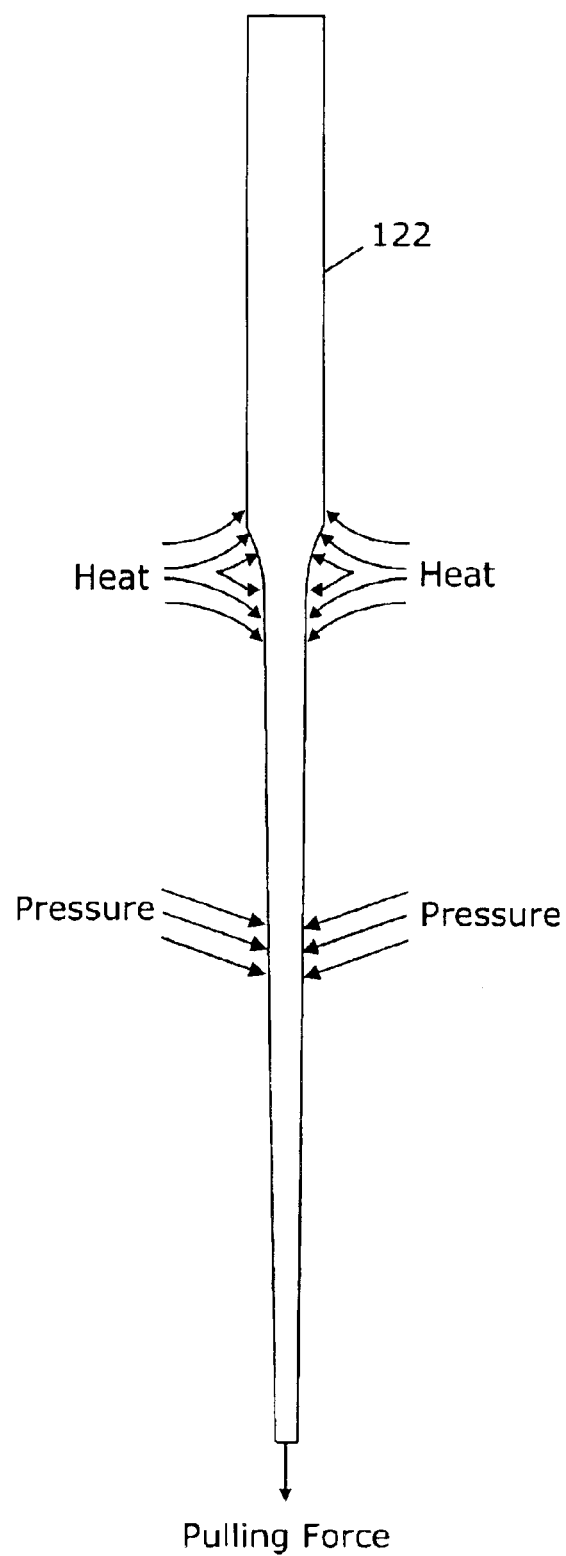
FIG. 10 illustrates a method for drawing a single glass unit into glass tubing.

The glass tubing is formed by drawing the sealed glass unit 122 into the desired tubing size. Any conventional drawing process can be used to draw the sealed glass unit 122 into the desired tubing size. As shown in FIG. 10, a typical drawing process would involve heating the sealed glass unit 122 while applying tension along a longitudinal axis of the glass unit 122. Pressurized fluid may also be applied to the outer surface of the glass unit 122 during the drawing process to assist in forming a precise tubing size. Also, vacuum or pressure may be applied to the bores in the sealed glass unit 122 to allow for control of the diameter of the bores in the sealed glass unit during the drawing process.

In another embodiment of the invention, the glass unit 122 is drawn into the required tubing size without an initial sealing process. The process is as follows: in FIG. 11A, the glass unit 122 is inserted into an outer clad glass tube 138 to form a tube assembly 140. A retainer (not shown) may have to be placed at one or both ends of the outer clad glass tube 138 to prevent the glass unit 122 from falling out of the outer clad glass tube 138. Alternatively, the inner diameter of the outer clad glass tube 138 can be selected such that the glass unit 122 fits snugly inside the outer clad glass tube 138. The next step in the process is to draw the tube assembly 140 to form a glass tubing (140 in FIG. 11A) having a desired inner dimension. This desired inner dimension may or may not be the required final dimension. FIG. 11B shows the glass tubing 142 formed by drawing the tube assembly (140 in FIG. 11A). The bores 124, 126 have the desired diameters. The outer surface of the glass tubing 142 may be machined as necessary to obtain a desired outer dimension.

As previously mentioned, the tube assembly 140 can be drawn (in one step) such that the glass tubing 142 has the required final dimension. For improved tolerance, the tube assembly 140 can be drawn such that the glass tubing 142 has some intermediate dimensions that is not the required final dimensions. In this case, the glass tubing 142 can then be drawn again to obtain the required final dimensions. In general, the glass tubing 142 can be drawn as many times as desired to obtain the required final dimensions with the desired tolerance. The additional drawing step(s) would involve inserting the glass tubing 142 into an outer clad glass tubing to form a tubing assembly and then drawing the tubing assembly to obtain a new glass tubing having a desired inner dimension. The outer surface of the newly formed glass tubing may be machined to obtain the desired outer dimension. For example, assume that the glass tubing 142 does not yet have the required final dimensions. Then, the glass tubing 142 can be drawn a second time to achieve the required final dimensions. FIG. 11C shows the glass tubing 142 inserted into an outer clad glass tubing 144 to form a tubing assembly 146. The tubing assembly 146 is then drawn to form a glass tubing (148 in FIG. 11D) with the required final dimensions.

The following is an example of a glass tubing formed in two draw steps. The required final dimensions of the glass tubing is 1.8 mm on the outer diameter and 0.125 mm on the inner diameter, i.e., each bore in the glass tubing has a diameter of 0.125 mm.

Figure 11A:
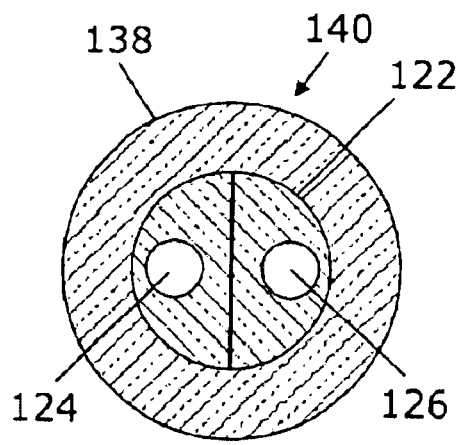
FIG. 11A shows a single glass unit inserted into an outer clad tube to form a tube assembly.
Figure 11B:
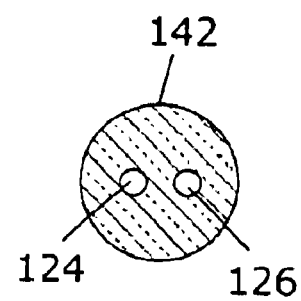
FIG. 11B shows the tube assembly of 11A after drawing into a single tube.
Figure 11C:
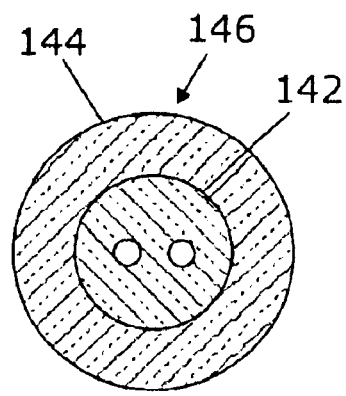
FIG. 11C shows the single tube of FIG. 11B inserted into an outer clad tube to form a tube assembly.
Figure 11D:
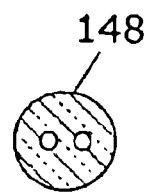
FIG. 11D shows the tube assembly of FIG. 11C after drawing into glass tubing.

The process starts with a glass tube (122 in FIG. 11A) having two bores (124, 126 in FIG. 11A). The nominal outer diameter of the glass tube is 37.5 mm and the nominal inner diameter of the glass tube is 11.5 mm. The glass tube is inserted into an outer clad glass tube (138 in FIG. 11A) to form a tube assembly (140 in FIG. 11A). The outer clad glass tube has a nominal outer diameter of 60 mm. The tube assembly is drawn down to form a glass tubing (142 in FIG. 11B) having a nominal inner diameter of approximately 3 mm. The outer diameter of the glass tubing is then ground to a nominal size of 11.49 mm.

For the second draw process, the glass tubing (142 in FIG. 11B) is inserted into an outer clad glass tubing (144 in FIG. 11C) to form a tubing assembly (146 in FIG. 11C). The outer clad glass tubing has a nominal outer diameter of 40.6 mm. The tubing assembly is then drawn to the required final dimensions. The final dimensional size in this case is 1.8 mm on the outer diameter and 0.125 mm on the inner diameter.

The invention provides one or more advantages. The invention provides a method for forming multiple-bore glass tubing with precise inner and outer dimensions and tolerances. The glass tubing produced by the method of the invention can be used to manufacture capillary splices.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of making glass tubing, comprising:
   assembling together a first glass rod having at least one bore and a second glass rod having at least one bore to form a single glass unit;
   shaping an outer surface of the glass unit to a desired cross-section; and
   drawing the glass unit to form a glass tubing having a predetermined inner and outer dimension.

2. The method of claim 1, wherein an outer surface of each glass rod comprises a flat surface.

3. The method of claim 2, wherein assembling together the first and second glass rods comprises placing the flat surface of the first glass rod adjacent the flat surface of the second glass rod.

4. The method of claim 2, wherein an outer surface of each glass rod comprises a round surface.

5. The method of claim 4, wherein shaping the outer surface of the glass unit comprises shaping the round surfaces of the glass rods to form the desired cross-section.

6. The method of claim 1, further comprising sealing together the glass rods prior to drawing the glass unit.

7. The method of claim 6, wherein sealing together the glass rods comprises shrinking the glass rods to size the bores in the glass rods to a desired diameter.

8. The method of claim 7, wherein sealing the glass rods comprises inserting a removable rod having the desired diameter inside each bore and applying heat to the glass rods to shrink the glass rods around the removable rod.

9. The method of claim 8, further comprising applying pressure to the glass rods to assist in shrinking the glass rods around the removable rods.

10. The method of claim 8, wherein sealing the glass rods comprises cooling the glass rods after shrinking the glass rods around the removable rods.

11. The method of claim 7, wherein the removable rods are made of a material that can be easily oxidized.

12. The method of claim 7, wherein the removable rods are made of a material that shrinks faster than glass during cooling.

13. The method of claim 1, wherein drawing the glass unit comprises inserting the glass unit into an outer clad glass tube to form a tube assembly and drawing the tube assembly to form the glass tubing having the predetermined inner and outer dimensions.

14. The method of claim 13, wherein drawing the glass unit comprises machining an outer surface of the glass tubing to obtain the predetermined outer dimension.

15. The method of claim 13, further comprising drawing the glass tubing to obtain a required inner and outer dimension.

16. The method of claim 15, wherein drawing the glass tubing comprises forming at least one intermediate tubing assembly and drawing the intermediate tubing assembly to obtain the required inner and outer dimension.

17. The method of claim 16, wherein forming the intermediate tubing assembling comprises inserting the glass tubing inserted into an outer clad glass tubing.

18. A method of making glass tubing, comprising:
   assembling together a first glass rod having at least one bore and a second glass rod having at least one bore to form a single glass unit;
   shaping an outer surface of the glass unit to a desired cross-section;
   inserting the glass unit into an outer clad glass tube to form a tube assembly; and
   drawing the tube assembly to form a glass tubing having a predetermined inner and outer dimension.

19. The method of claim 18, further comprising drawing the glass tubing to obtain a required inner and outer dimension.

20. The method of claim 19, wherein drawing the glass tubing comprises inserting the glass tubing inside an outer clad glass tubing to form a tubing assembly and drawing the tubing assembly to obtain the required inner and outer dimensions.

21. The method of claim 19, wherein the glass tubing is drawn to obtain the required inner and outer dimensions in multiple steps.

22. The method of claim 19, wherein drawing the glass tubing comprises machining an outer surface of the glass tubing to obtain the required outer dimension.

* * * * *